US012325107B2

(12) United States Patent
Neff

(10) Patent No.: US 12,325,107 B2
(45) Date of Patent: Jun. 10, 2025

(54) TEXTURE PATTERN FOR ABRASIVE TOOL

(71) Applicant: Charles Neff, Clinton Township, MI (US)

(72) Inventor: Charles Neff, Clinton Township, MI (US)

( * ) Notice: Subject to any disclaimer, the term of this patent is extended or adjusted under 35 U.S.C. 154(b) by 1025 days.

(21) Appl. No.: 17/353,442

(22) Filed: Jun. 21, 2021

(65) Prior Publication Data

US 2021/0308831 A1 Oct. 7, 2021

Related U.S. Application Data

(62) Division of application No. 15/443,716, filed on Feb. 27, 2017, now Pat. No. 11,040,430.

(60) Provisional application No. 62/301,336, filed on Feb. 29, 2016.

(51) Int. Cl.

| | |
|---|---|
| ***B24D 5/14*** | (2006.01) |
| ***B24B 5/04*** | (2006.01) |
| ***B24D 11/04*** | (2006.01) |
| ***B24D 18/00*** | (2006.01) |
| ***B41N 3/04*** | (2006.01) |

(52) U.S. Cl.

CPC .................. *B24D 5/14* (2013.01); *B24B 5/04* (2013.01); *B24D 11/04* (2013.01); *B24D 18/0009* (2013.01); *B24D 18/0054* (2013.01); *B41N 3/04* (2013.01)

(58) Field of Classification Search

CPC . B24D 5/14; B24D 5/04; B24D 11/04; B24D 18/0009

See application file for complete search history.

(56) References Cited

U.S. PATENT DOCUMENTS

| | | | |
|---|---|---|---|
| 2,624,159 | A | 1/1953 | Balsiger |
| 3,067,551 | A | 12/1962 | Maginnis |
| 3,537,216 | A | 11/1970 | Borgh |
| 3,802,103 | A | 4/1974 | Neff |
| 5,181,939 | A | 1/1993 | Neff |
| 5,213,590 | A | 5/1993 | Neff |
| 5,336,279 | A | 8/1994 | Neff |
| 5,379,554 | A | 1/1995 | Thurman et al. |
| 5,496,208 | A | 3/1996 | Neff |
| 5,573,449 | A | 11/1996 | Mackowsky |
| 5,645,471 | A | 7/1997 | Strecker |
| RE35,812 | E | 6/1998 | Oliver |
| 5,888,129 | A | 3/1999 | Neff |
| 6,277,160 | B1 | 8/2001 | Stubbs et al. |
| 6,428,407 | B1 | 8/2002 | Elder |
| 7,204,664 | B2 | 4/2007 | Nakahishi et al. |
| 8,113,915 | B2 | 2/2012 | Jankowski et al. |
| 10,092,997 | B2 | 10/2018 | Watanabe |

(Continued)

*Primary Examiner* — Pegah Parvini

(74) *Attorney, Agent, or Firm* — Leydig, Voit & Mayer, Ltd.

(57) ABSTRACT

The present disclosure relates to a method for making a grinding wheel with abrasive surfaces located on an outer diameter of the grinding wheel to provide grinding characteristics of both coarse and fine abrasive textures. The method includes forming on the grinding wheel a coarse abrasive portion located proximate to a first axial end of the outer diameter, a fine abrasive portion located proximate to a second axial end of the outer diameter and a transition band formed at an interface between the abrasive surfaces. The transition band has an abrasive coating with a gradual change in texture from a coarse surface to a fine surface.

20 Claims, 3 Drawing Sheets

(56) References Cited

U.S. PATENT DOCUMENTS

| | | | |
|---|---|---|---|
| 2004/0009741 | A1 | 1/2004 | Nonoyama et al. |
| 2017/0246727 | A1 | 8/2017 | Neff |

TEXTURE PATTERN FOR ABRASIVE TOOL

CROSS REFERENCE TO RELATED APPLICATIONS

This is a divisional application of U.S. application Ser. No. 15/443,716, filed on Feb. 27, 2017, which application claims the benefit of provisional application 62/301,336, filed Feb. 29, 2016. The subject matter of these applications are incorporated by reference herein in its entirety.

FIELD OF THE INVENTION

The present disclosure generally relates to high friction surfaces for use in abrasive applications, and more particularly, to a tool having abrasive textured portions of different coarseness and a transition band with gradually changing coarseness at an interface between abrasive textured portions.

BACKGROUND OF THE INVENTION

This disclosure may be used to facilitate the grinding of feed rollers of the type used in printing operations. Such feed rollers advance paper through sequential operations of the printing process. A feed roller is typically a cylindrically shaped structure constructed from a compliant material such as natural rubber or a synthetic polymer which covers a steel core. Through repeated usage, the surface of the feed roller becomes worn necessitating resurfacing and or renewal. If the wear is minimal, however, a small portion of the compliant layer can be removed to refresh the surface characteristics. If the wear is more extreme the compliant layer must be removed from the core and replaced.

In both instances the dimension and surface finish of the compliant cover is created by a grinding operation. The type of grinder used in such an operation is an O.D. grinder. “O.D. grinder” is a term of art used to describe a piece of equipment or an operation in which the roller is held while it is rotated about its longitudinal axis as a grinding wheel rotating about a parallel axis is engaged with the compliant cover and traversed axially there along. In this manner the axis of rotation of the compliant cover is trued up to the axis of the core. In addition the outermost diameter of the compliant portion and the surface finish characteristics of the roller are established.

When a great deal of material must be removed from a roller, it is usually done in a two-step operation. In a first pass, material is removed relatively quickly leaving a rough, but oversized, roller dimension. In a second pass, a lighter cut is made leaving a relatively smooth roller surface finish. These two operations may be performed using two grinding wheels and two different grinding machines.

Alternatively, both operations may be accomplished simultaneously using a dual-textured grinding wheel. A dual textured grinding wheel has a coarse textured abrasive coating on its leading cylindrical portion and a fine textured abrasive coating on its trailing cylindrical portion. The leading, trailing distinction comes with reference to the axial path taken by the grinding wheel during a grinding operation as it traverses the length of the roller.

Although, a dual textured grinding wheel provides an improvement in operational efficiency, this is accomplished at the cost of degradation in the grind quality of the roller. It has been discovered that a dual-textured grinding wheel causes unique stresses in the compliant material as it is being ground. These stresses cause deformation of the compliant material which results in material being removed from the roller while it is in the deformed shape such that upon relief of the grinding stresses the final relaxed dimension is not identical to the dimension that existed during the grinding process. This problem is exacerbated by the juxtaposition of two different abrasive textures as found on a dual textured grinding wheel. The result is an unpredictable dimension and degraded surface finishes.

BRIEF SUMMARY

The present disclosure includes a grinding wheel having its circumferential portion characterized by abrasive portions of different coarseness. A coarse textured portion provides relatively rapid material removal from a work piece. A fine textured portion then provides a relatively smooth surface finish. The abrasive portions are located axially opposite each other on the outer circumferential portion of the grinding wheel. A transition band is located in the region intermediate the two abrasive portions. The transition band provides a gradation in texture of the abrasive surface while moving in an axial direction between the coarse textured portion and the fine textured portion. The extremes of the texture of the abrasive surface in the transition band are defined as maximum coarseness at one axial limit and minimal coarseness at the opposite axial limit.

In this manner the grinding wheel may traverse along the surface of a work piece to provide simultaneous roughing and finishing operations in a single pass, while eliminating the surface finish problems inherent in a grinding wheel having a discrete parting line transition between coarse and fine abrasive textures.

BRIEF DESCRIPTION OF THE DRAWINGS

Further features and advantages of the present disclosure will be apparent to those skilled in the art to which the invention relates from the following detailed description of the invention made with reference to the accompanying drawings in which.

DETAILED DESCRIPTION

The present disclosure relates to abrasives surfaces located on an outer diameter of a grinding wheel to provide grinding characteristics of both coarse and fine abrasive textures. The disclosure provides a texture pattern with a transition band formed at an interface between the abrasive surfaces, that has an abrasive coating with a gradual change in texture from a coarse surface to a fine surface.

Figure 1:
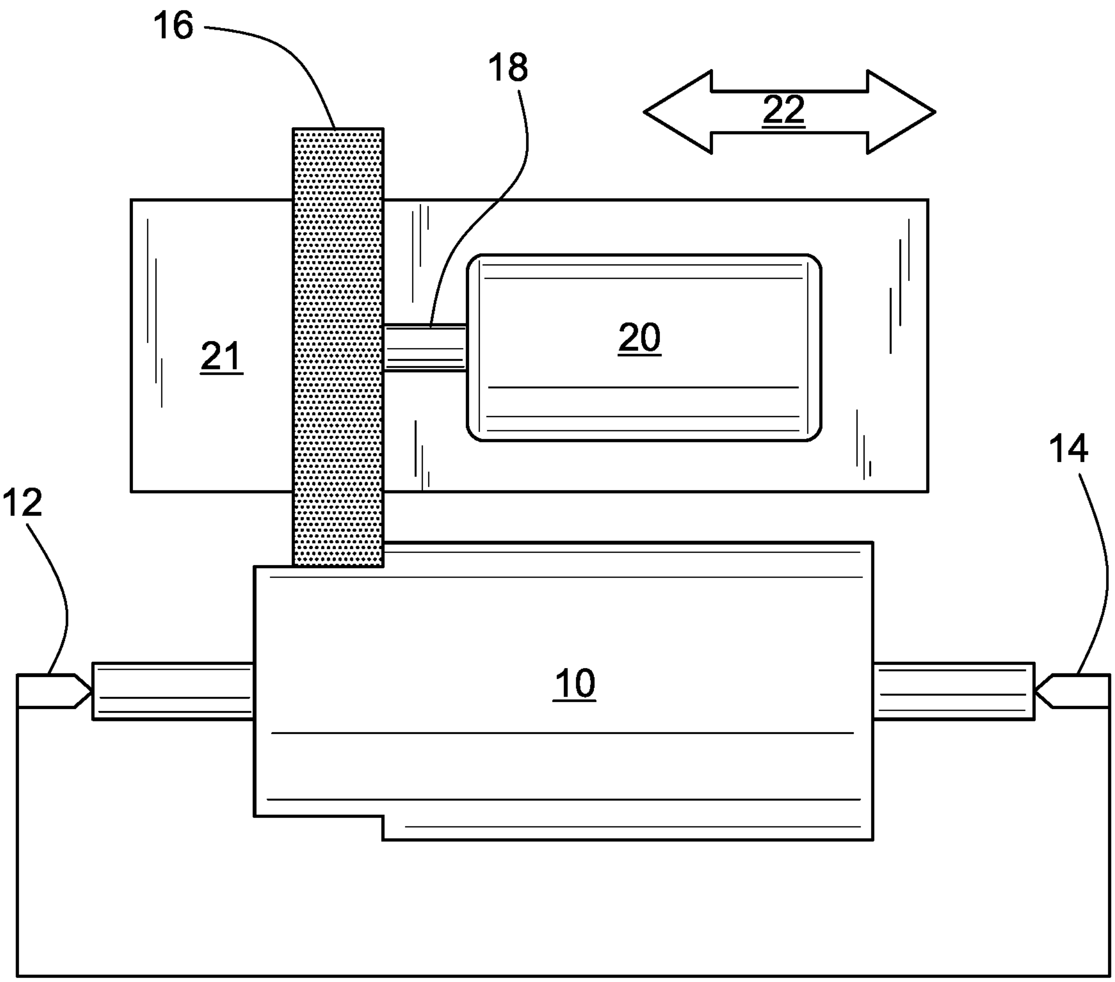
FIG. 1 is a plan view of an OD grinding machine.

The surfaces of rollers in papermaking and other web feeding apparatus are often covered with a compliant material that becomes worn. These surfaces may be renewed using an OD grinder to remove the worn portion. FIG. 1 generally shows an OD grinding operation. A cylindrical workpiece (e.g., the roller) 10 is placed between centers 12 and 14 and rotated. A grinding wheel 16 is mounted for rotation on a shaft 18 driven by a motive means such as electric motor 20. The motor, shaft and wheel are mounted on carriage 21 that provides for translation in the direction indicated by arrow 22. As illustrated in FIG. 1, the grinding wheel 16 moves to the right to perform the resurfacing operation. In this manner the worn portion of roller 10 is removed leaving the outer surface smooth. A similar procedure is often used to prepare the surface of a roller during manufacturing.

Figure 2:
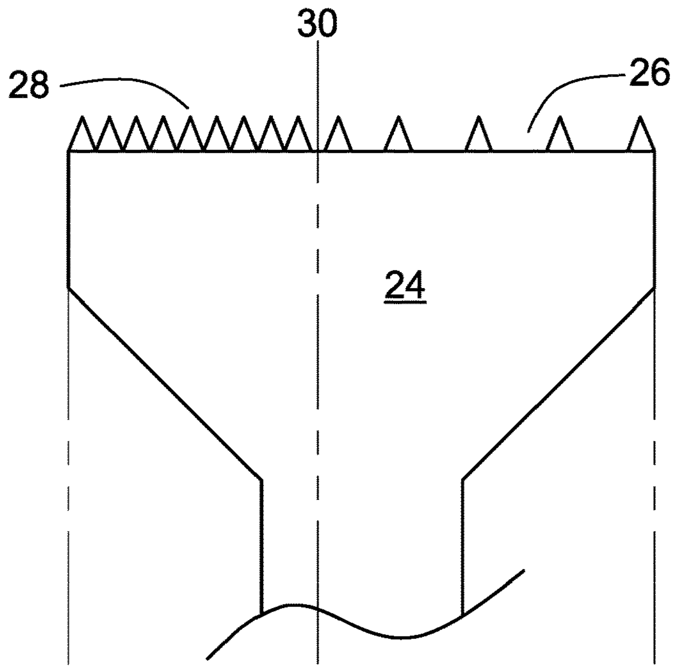
FIG. 2 is a cross section of a fragment of a prior art, dual textured grinding wheel.

A prior art dual textured grinding wheel 24 is illustrated in FIG. 2. The wheel 24 is a right circular cylinder having surface portions comprising portions 26 having a coarse abrasive texture and 28 having a fine abrasive texture. Grinding wheel 24 provides a transition at a discrete location 30 located between the coarse and fine abrasive coatings. It has been discovered that this juxtaposition of different abrasive textures exacerbates the grinding phenomena. In particular, stresses in the form of compression and tension cause deformation of the compliant material. This results in material being removed from the roller while it is in the deformed shape such that upon relief of the grinding stresses the final relaxed dimension is not identical to the dimension that existed during the grinding process. This problem is exacerbated by the axial juxtaposition of two different textures as appears on a dual textured grinding wheel. It is believed that a “standing wave” moves along the roller as the grinding wheel traverses its grinding path. The result is an unpredictable dimension and degraded surface finishes.

In use the grinding wheel 24 engages roller 10 as shown in FIG. 1 and is advanced in direction 22 so as to first engage coarse abrasive texture 26 followed by the fine abrasive texture 28. The final product produced by this operation is a right circular cylinder equal to the original work piece diameter less the depth of cut removed by the grinding operation.

A common texture gradation is found in the industry for abrasive coatings of the type described in U.S. Pat. Nos. 5,213,590, 5,181,939, 5,336,279, and 5,496,208 to Neff, the disclosures of which are incorporated herein by reference in their entirety. The texture gradation is based on the dimension between abrasive structures that constitute the abrasive coating. In the referenced teachings, the abrasive elements are located on a grinding surface in repeating texture patterns. Hence a reference to the dimension between abrasive elements comprising the coating for the grinding surface provides a delineation of texture gradation.

Figure 3:
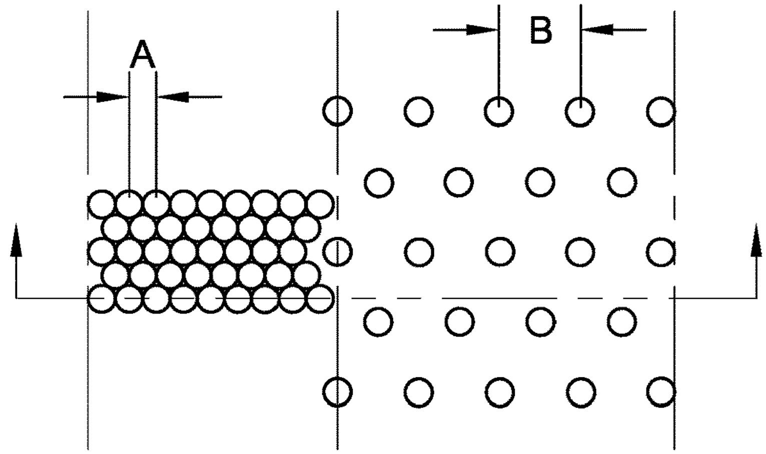
FIG. 3 is a plan view of the abrasive elements present on a dual texture grinding wheel.
Figure 4:
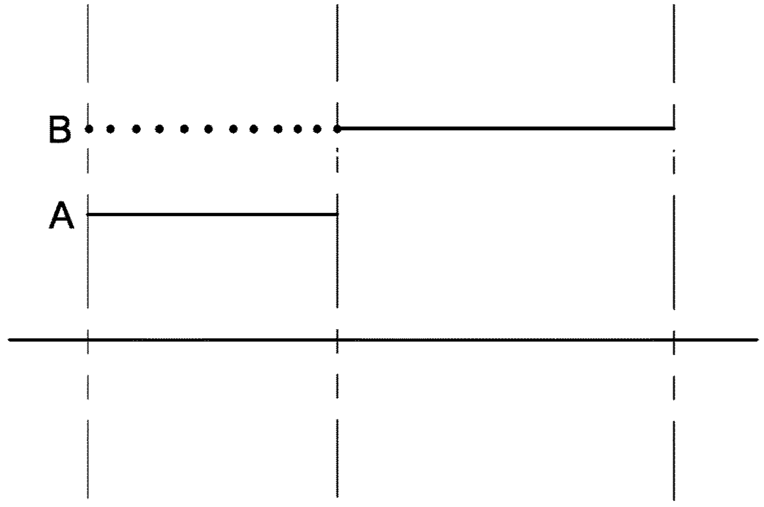
FIG. 4 is graphic depiction of the spacing of abrasive elements on a dual texture grinding wheel.

One such abrasive coating designation is known in the art as a “40 series” because it is based on abrasive elements spaced 0.040 inches from one another. Another example is known in the art as a “140 series,” which is a coarse textured abrasive coating having elements spaced at 0.140 inches. FIG. 3 illustrates the arrangement of abrasive elements that would be found on a prior art dual textured grinding wheel incorporating such a coating. In FIG. 3, for example, dimension A is 0.040 and dimension B is 0.140 inches. FIG. 4 illustrates a two axis depiction of the abrasive element spacing on a dual textured grinding wheel. The horizontal axis is representative of the location of an abrasive element as it appears on the periphery of the grinding wheel. The vertical axis depicts a scaled representation of the magnitude of the abrasive element spacing for the respective texture. As illustrated, a discrete transition in abrasive element spacing occurs at vertical line 30.

Figure 5:
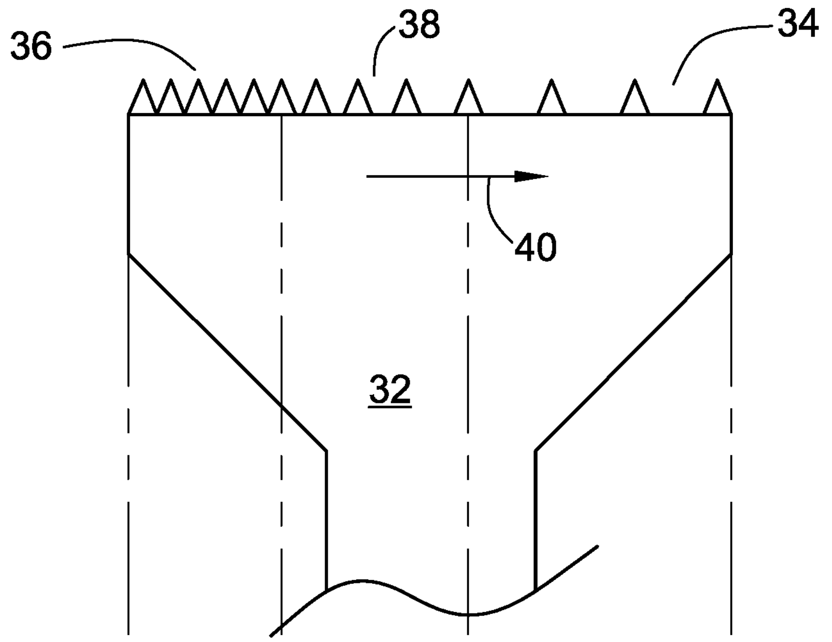
FIG. 5 is a cross section of a fragment of the grinding wheel of the present disclosure.
Figure 6:
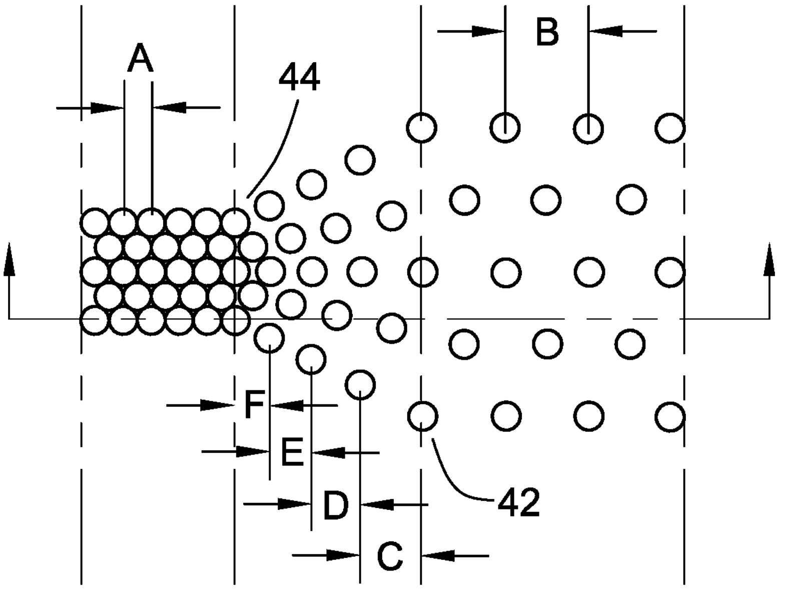
FIG. 6 is a plan view of the abrasive elements arranged according to the teaching of the present disclosure.
Figure 7:
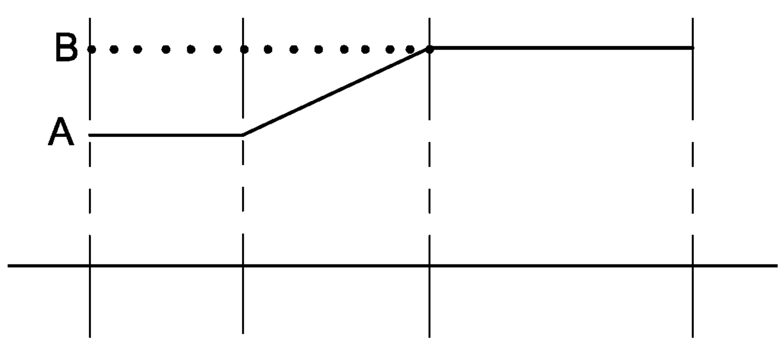
FIG. 7 is a graphic depiction of the spacing of abrasive elements arranged on a grinding wheel according to the teaching of the present disclosure.

The preferred embodiment of the present disclosure is illustrated in cross section in FIGS. 5-7. As shown therein, a grinding wheel 32 is a right circular cylinder having outer surface portions comprising disparate first and second textured portions 34 and 36. The first textured portion 34 has a coarse abrasive textured coating disposed thereon. By contrast, the second textured portion 36 has a fine abrasive textured coating, relative to the first textured portion 34. An intermediate portion 38, disposed between the first textured portion 34 and the second textured portion 36, has a transition abrasive coating. The transition abrasive coating in the intermediate portion 38, in a preferred embodiment, continuously changes from fine to coarse, when viewed in an axial direction along the periphery of the grinding wheel in the direction of travel, shown schematically by an arrow 40 in FIG. 5.

In use, the grinding wheel 32 engages roller 10 as shown in FIG. 1 and is advanced in direction 22 so as to first engage the first or coarse abrasive texture portion 34, followed by the intermediate portion 38, and finally the second or fine abrasive texture portion 36. The final product produced by this operation is a right circular cylinder, such as a roller used in a printing operation, with a dimension that is equal to the original work piece diameter less the depth of cut removed by the grinding operation.

In a preferred embodiment of the present disclosure, therefore, the grinding wheel 32 has two discrete portions located at opposite axial extremes of its outer periphery. A transition portion located there between has abrasive elements spaced such that they provide a continuously changing texture. Specifically, The second or fine abrasive texture portion 36 has a coating of abrasive elements spaced at 0.040 inches. On the other hand, the first or coarse abrasive texture portion 38 has a coating of abrasive elements spaced at 0.140 inches apart. The abrasive coating in the transition band 38 has abrasive elements with a continuously changing element spacing in relation to each other ranging in spacing between 0.040 inches and 0.140 inches.

FIG. 7 provides a two-axis depiction of the abrasive element spacing as such elements are coated on a grinding wheel incorporating the teachings of the present invention. The horizontal axis is representative of the respective position in which an abrasive element appears on the grinding wheel periphery. The vertical axis depicts a scaled representation of the magnitude of the abrasive element spacing as it appears on the grinding wheel. The change in element spacing is depicted by the sloping line between the fine and coarse textures found at opposing ends of the grinding wheel periphery. Providing a continuous change in abrasive element spacing in this transition region avoids the abrupt change in grinding stresses imposed on the compliant cover of a roller resulting in improved grinding performance.

In a preferred embodiment, the first or coarse abrasive coating portion 34 is formed of a plurality of spaced apart rows of abrasive elements. The rows of abrasive elements in the first abrasive portion 34 are interleaved with adjacent rows of abrasive elements. With reference to the direction of travel of the grinding wheel, the abrasive elements in a single row each have an axial spacing of 0.140 inches with respect to a non-interleaved adjacent row, represented by the letter “B” in FIG. 6. The interleaved rows of abrasive elements are themselves axially spaced from adjacent non-interleaved rows by 0.140 inches. Thus, a boundary or edge of the first abrasive portion 34 is illustrated in FIG. 6 by a row of abrasive elements 42.

FIG. 6 also illustrates rows of abrasive elements for the second or fine abrasive portion 36 in greater detail. In the illustrated embodiment, the abrasive elements in each of the rows have a axial spacing of 0.040 inches with respect to abrasive elements in non-interleaved adjacent rows, as shown by the letter "A" in FIG. 6. Similar to the first abrasive portion 34, a boundary or edge of the second abrasive portion 36 is shown by a row of abrasive elements 44.

The phrase "continuously varying" is used herein to describe the spacing between abrasive elements in the transition region. It should be understood, however, that in a preferred embodiment the abrasive elements located in the intermediate portion 38 have discrete dimensional distances with respect to each other, as well as between the respective rows of abrasive elements 42 and 44. For providing a transition between a first abrasive portion 34 with an element spacing of 0.140 inches and a second abrasive portion 36 with abrasive element spacing of 0.040 inches, a transition band including four rows of abrasive elements may be located in the intermediate portion 38, as shown in FIG. 6. As with the rows of abrasive elements in the first abrasive portion 34 and the second abrasive portion 36, the rows of abrasive elements in the intermediate portion 38 comprise interleaved adjacent rows. In this layout, the spacing between adjacent rows of abrasive elements in the intermediate portion 38 has a spacing of 0.120 inches in relation to an abrasive element row proximate to the edge of first abrasive portion 34, as shown by the distance denoted by the letter "C". The spacing between the next row of abrasive elements in the intermediate region has a spacing of. 100 inches, as denoted by the letter "D". The spacing between the row of abrasive elements in the intermediate portion 38 proximate to the second abrasive portion 36 is 0.080 inches, as denoted by the letter "E". The spacing between the row of abrasive elements in the intermediate portion 38 proximate the third abrasive portion 36 is 0.060 inches as denoted by the letter "F". In this way, the spacing between rows of abrasive elements in the transition region can be though of as "continuously varying."

While the above-described transition band example may to used to form a grinding wheel that has discrete "140 series" and "40 series" abrasive coating portions, those skilled in the art will appreciate that different transition band layout of abrasive elements may be utilized to achieve the advantages of the present disclosure. For example, the first abrasive portion 34 may be a "125 series" (0.0125 inches) that transitions to a "35 series" (0.035 inches) for the second abrasive portion 34. Alternatively, the first abrasive portion and second abrasive portion may be of different spacings altogether. In either case, abrasive coatings of different sizes may be utilized with appropriate modification of the transition band layout, as long as a gradation is achieved between the abrasive element spacing of the respective coating portions. The principles of the disclosure may be used to form grinding wheels having three or more abrasive coating portions in which a transition band is formed at the interface between two coating portions to achieve a graduated transition of abrasive element spacing therebetween.

In a preferred embodiment, desired placement of the abrasive elements in the patterns corresponding to the first and second texture portions, and in the transition band region, may be carried out as more fully described in the above-referenced patents to Neff incorporated herein by reference in their entirety. That is, the desired texture portions and the transition band region may be formed on an abrasive surface using a magnetic flux concentration. To do so, a fixture is employed that includes a generally planar magnetized base surface with protrusions formed thereon to provide a mosaic surface. The protrusions may be machined into the surface or applied to the surface in the form of discreet elements such as steel balls. A release mechanism or covering layer is then applied over the mosaic surface. The release mechanism may take the form of a thin coating of silicone or a thin sheet of polymeric material (such as Teflon).

Magnetizable abrasive particles are diffused onto the surface of the release mechanism. The particles orient themselves along the lines of magnetic flux to form generally cone-shaped elements or stacks having generally triangular cross sections. The stacks define a working surface for a tool. If small steel balls are used, conical structures or cones will form at the locations of magnetic flux concentration through the balls.

A coat of acrylic paint is then applied to the elements to provide structural integrity. Prior to solidification of the paint, the cones may be shaped by passing an appropriate magnetic field near them. For example, a magnet of opposite polarity from the polarity of the base surface magnet will cause the cones to grow in height: whereas, an identically poled magnet will cause the cones to flatten. This magnet may also be used to selectively orient the base surface magnetic field which emanates from the protrusions to cause a realignment of the elements. This technique is used to produce asymmetrical cones which offer desired cutting points on the working surface of the abrasive tool. After the cones have been shaped and the paint has dried or solidified, a braze paste consisting of a binder mixed with braze alloy is applied to encapsulate the cones and form a structural interconnection or flexible support web between the cones to maintain the cones in preselected positions on a flexible web before brazing. The braze alloy joins the cones in a solid structure or pattern after brazing.

After the braze paste binder has dried or solidified, the entire matrix may be removed from the base fixture leaving the balls or other projections in place for further use. The abrasive element matrix may then be cut to a desired shape. The release mechanism may then be removed from the matrix and the matrix may be secured to another base structure such as a tool form having a smooth surface by application of an acrylic adhesive. The acrylic adhesive may be brushed on the matrix or the base structure or in the alternative may be preinstalled and protected by a release liner. At this point, the assembly of matrix and base structure may be placed in a braze furnace and heated to the necessary brazing temperature while maintaining a controlled atmosphere such as hydrogen or a substantial vacuum. After the brazing process has been completed, the assembly will feature a high friction surface which may be used as an abrasive tool.

As an alternative, the abrasive tool may be fabricated using a mold to produce a bonded abrasive grit structure, such as is disclosed in U.S. Pat. Re. 35,812, the subject matter of which is also incorporated herein by reference. The bonded abrasive grit structure includes a plurality of peaked portions on a substrate layer with the peaked portions. The peaked portions have at least one abrasive grit particle at or near the apex of the peaked portions. The abrasive grit particle is substantially surrounded by a setting material. The remainder of the structure comprises a particulate matter having a melting point temperature higher than a melting point of a brazing compound that is used in further processing steps. A flexible hydrocarbon resin binder is dispersed throughout the structure to temporarily bind together the abrasive grit particles, the setting material and the particulate matter. The hydrocarbon resin binder is driven from the structure at a relatively low temperature. The structure is attached to a tool surface by a brazing process.

In this case, a bonded abrasive grit structure is formed by first providing a mold member having a plurality of concave indentations formed therein corresponding to the desired pattern of first and second texture portions, and the transition band region. Abrasive grit particles are placed in the concave indentations, which are thereafter filled with a setting matrix to a level covering the abrasive grit particles and filling of said indentations. The indentations are saturated with a resin binder to adhere the structure together as the binder cures, after which the resin binder may released from the structure. The structure is then removed from the mold such that it may be attached to a substrate. In this embodiment, the abrasive particles may include any kind of metal carbide, boride grits or grits which are harder than metal carbides and up to and including a diamond like hardness. For instance, various cast or sintered metal carbide grits, harder grits such as cubic boron nitrite, polycrystalline diamond or natural diamond grits can be used.

Various advantages flow from the disclosure as set forth herein. For example, the grinding wheel has a longer life due to the removal of an abrupt transition between adjacent coating portions. Moreover, the dimensions of the work-piece surface can be more closely controlled as a grinding wheel according to this disclosure traverses along its path. That is, the grinding wheel provides simultaneous roughing and finishing operations in a single pass, while eliminating the surface finish problems inherent in discrete parting line transition between coarse and fine abrasive textures.

Those skilled in the art will recognize that certain details shown in the foregoing specification and drawings are exemplary in nature and may be modified without departing from the teachings of the disclosure. All such modifications and variations that basically rely on the teachings through which the invention has advanced the art are properly considered within the spirit and scope of the invention, as defined by the following claims.

The invention claimed is:

1. A method for making an abrasive tool including a substrate layer and an abrasive surface layer defining a grinding surface with first and second axial ends, comprising the following steps:

(a) defining a pattern of abrasive elements corresponding to a first coating portion having a first spacing defining a first coarseness to be located on the abrasive surface layer, a second coating portion having a second spacing defining a second coarseness, and a transition coating portion disposed at an interface between the first coating portion and the second coating portion, the pattern of abrasive elements for the transition coating portion having spacings that vary from one another to define a continuously varying coarseness ranging from the first coarseness on the first coating portion to the second coarseness on the second coating portion;

(b) depositing a plurality of abrasive elements on a surface according to the pattern;

(c) forming a matrix including the plurality of abrasive elements to provide the abrasive surface layer; and (d) adhering the abrasive surface layer to the substrate.

2. The invention as in claim 1 wherein forming the abrasive surface layer further includes the steps of:

(a) affixing magnetizable elements to a release mechanism according to the pattern such that the magnetizable elements vary in displacement from one another to define a varying coarseness;

(b) applying a magnetic field to magnetize the magnetizable elements;

(c) applying magnetizable particles to said magnetizable elements and the release mechanism and arranging the particles by magnetic flux concentrations provided to the magnetizable elements acting in the magnetic field to form the abrasive elements; and (d) applying a binder to at least partially encapsulate the magnetizable particles and to form a structural interconnection therebetween.

3. The invention as in claim 2 wherein the magnetizable particles are magnetizable abrasive particles and wherein the binder comprises a layer of material having a melting point lower than the magnetizable particles and the substrate layer of the tool.

4. The invention as in claim 1 wherein the steps of forming the abrasive surface layer further includes the steps of:

providing a mold member having a plurality of concave indentations therein that vary in displacement from one another according to the pattern;

placing at least one abrasive grit particle in each of said concave indentations;

saturating the indentations with a resin binder;

curing said binder to form the matrix; and removing the matrix from the mold member.

5. The invention as in claim 4 wherein the abrasive grit particles are selected from the group consisting essentially of diamond particles, particles made from crushed cast tungsten metal group carbides, particles made from crushed sintered tungsten group of carbides that are bonded with cobalt, cubic boron nitride particles and mixtures thereof.

6. A method for making an abrasive grinding tool for performing work on a work-piece in which the grinding tool includes a substrate layer and an abrasive surface layer defining a grinding surface with first and second axial ends, comprising the following steps:

(a) defining a pattern of abrasive elements corresponding to: (i) a first coating portion defining the locations of a plurality of abrasive elements arranged in rows that are axially spaced apart by a first predetermined distance to define a coarse grit pattern located on the abrasive surface layer proximate to the first axial end, (ii) a second coating portion defining the locations of a plurality of abrasive elements arranged in rows of abrasive elements wherein the rows are axially spaced apart by a second predetermined distance, less than the first predetermined distance, to define a fine grit pattern located on the abrasive surface layer proximate to the second axial end, and (iii) a transition coating portion disposed at an interface between the first coating portion and the second coating portion, the transition coating portion defining the locations of abrasive elements arranged in spaced-apart rows wherein the rows are arranged at continuously varying distances from each other dependent on their axial position relative to said first and second axial ends such that the distance between first and second adjacent rows of abrasive elements proximate to the first coating portion is greater than the distance between third and fourth adjacent rows of abrasive elements proximate to the second coating portion to provide textures that continuously vary from the coarse grit pattern of the first coating portion to the fine grit pattern of the second coating portion;
(b) depositing a plurality of abrasive elements on a surface according to the pattern to provide an abrasive surface layer; and
(c) adhering the abrasive surface layer to the substrate layer.

7. The invention as in claim 6 wherein depositing a plurality of abrasive elements includes forming a matrix including the plurality of abrasive elements to form the abrasive surface layer and wherein adhering the abrasive layer to the substrate includes applying a layer of material having a lower melting point than the abrasive elements and wettable to the substrate layer of the tool.

8. The invention as in claim 7 wherein the first coating portion has a plurality of abrasive elements arranged in interleaved rows of abrasive elements spaced apart by a first predetermined distance to define the coarse grit pattern.

9. The invention as in claim 8 wherein the transition coating portion has abrasive elements arranged in spaced-apart rows at varying distances from each other.

10. The invention as in claim 9 wherein the transition coating portion has rows of spaced-apart abrasive elements interleaved with adjacent rows of abrasive elements.

11. The invention as in claim 10 wherein the magnitude of the change in abrasive element row spacing in the transition coating portion between the first predetermined distance of spaced apart abrasive elements rows in the first coating portion and the second predetermined distance of spaced apart rows in the second coating portion approximates a linear relationship.

12. A method for making an abrasive grinding tool for performing work on a work-piece in which the grinding tool includes a substrate layer and an abrasive surface layer located at an outer circumferential portion thereof, the method of forming the abrasive surface layer including the following steps:

forming a first coating portion having a first coarseness defined by at least three rows of abrasive elements wherein the axial spacing between a first row and a second row and between the second row and a third row is a first predetermined distance located on the abrasive surface layer proximate to the first axial end;

forming a second coating portion having a second coarseness, different from the first coarseness, defined by at least three rows of abrasive elements wherein the axial spacing between a first row and a second row and between the second row and a third row is a second predetermined distance and located on the abrasive surface layer proximate to the second axial end, and forming a transition coating portion disposed at an interface between the first coating portion and the second coating portion, the transition coating portion having a plurality of rows of abrasive elements wherein the rows are axially spaced from each other at distances such that the distance between a first row and a second row proximate to the first coating portion is greater than a distance between a third row and fourth row proximate to the second coating portion to provide textures that continuously vary from the coarseness of the first coating portion to the coarseness of the second coating portion.

13. The invention as in claim 12 wherein the first coating portion has rows of spaced-apart abrasive elements interleaved with adjacent rows of abrasive elements.

14. The invention as in claim 13 wherein the second coating portion has rows of spaced-apart abrasive elements interleaved with adjacent rows of abrasive elements.

15. The invention as in claim 14 wherein the transition coating portion has rows of spaced-apart abrasive elements interleaved with adjacent rows of abrasive elements.

16. The invention as in claim 15 wherein the distance between rows of abrasive elements in the transition coating portion proximate to the first coating portion is less than the distance between rows of abrasive elements in the first coating portion.

17. The invention as in claim 16 wherein the distance between rows of abrasive elements in the transition coating portion proximate to the second coating portion is greater than the distance between rows of abrasive elements in the second coating portion.

18. The invention as in claim 17 wherein the steps of forming the abrasive surface layer further include:
(a) defining a pattern of abrasive elements corresponding to a first coating portion, the second coating portion and the transition coating portion; and
(b) forming a matrix by depositing a plurality of abrasive elements according to the pattern in a mold member having a plurality of concave indentations therein that vary in displacement from one another according to the pattern.

19. The invention as in claim 18 wherein forming the abrasive surface layer further includes the steps of:
(a) affixing magnetizable elements to a release mechanism according to the pattern such that the magnetizable elements vary in displacement from one another to define a varying coarseness;
(b) applying a magnetic field to magnetize the magnetizable elements;
(c) applying magnetizable particles to said magnetizable elements and the release mechanism and arranging the particles by magnetic flux concentrations provided to the magnetizable elements acting in the magnetic field to form the abrasive elements; and
(d) applying a binder to at least partially encapsulate the magnetizable particles and to form a structural interconnection therebetween.

20. The invention as in claim 12 wherein forming the abrasive surface layer further includes the steps of:
(a) providing a mold member having a plurality of concave indentations therein that vary in displacement from one another according to the pattern;
(b) placing at least one abrasive grit particle in each of said concave indentations;
(c) saturating the indentations with a resin binder;
(d) curing said binder to form the matrix; and
(e) removing the matrix from the mold member.

* * * * *